(12) United States Patent
Zhou et al.

(10) Patent No.: US 11,190,865 B2
(45) Date of Patent: Nov. 30, 2021

(54) DISPLAY MODULE AND MOBILE TERMINAL

(71) Applicant: Wuhan China Star Optoelectronics Technology Co., Ltd., Wuhan (CN)

(72) Inventors: Yongxiang Zhou, Wuhan (CN); Chunhung Huang, Wuhan (CN); Yucheng Tsai, Wuhan (CN); Tengteng Shi, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 148 days.

(21) Appl. No.: 16/625,784

(22) PCT Filed: Sep. 19, 2019

(86) PCT No.: PCT/CN2019/106813
§ 371 (c)(1),
(2) Date: Dec. 23, 2019

(87) PCT Pub. No.: WO2020/258543
PCT Pub. Date: Dec. 30, 2020

(65) Prior Publication Data
US 2021/0297758 A1   Sep. 23, 2021

(30) Foreign Application Priority Data
Jun. 28, 2019   (CN) .......................... 201910577404.X

(51) Int. Cl.
*H04R 1/02* (2006.01)
*G06F 3/16* (2006.01)
(Continued)

(52) U.S. Cl.
CPC ............... *H04R 1/028* (2013.01); *G06F 3/16* (2013.01); *H04R 1/288* (2013.01); *H04R 3/00* (2013.01);
(Continued)

(58) Field of Classification Search
CPC ....................................................... H04R 1/02
See application file for complete search history.

(56) References Cited

U.S. PATENT DOCUMENTS 10,671,114 B2 * 6/2020 Ahn ......................... H04R 1/025
2014/0357321 A1 * 12/2014 Yliaho ...................... H04R 7/045
455/566

(Continued)

FOREIGN PATENT DOCUMENTS

| CN | 203104537 | 7/2013 |
| CN | 105491474 | 4/2016 |

(Continued)

*Primary Examiner* — Olisa Anwah

(57) ABSTRACT

A display module and a mobile terminal are provided. The display module comprises a display panel comprising an earpiece area; and a vibration function layer disposed on a surface of the display panel and used to make mechanical vibrations under control of electric signals to generate sound waves; wherein the vibration function layer comprises an actuator and a vibration layer, the actuator comprises a vibrator disposed in the earpiece area and sound insulation sections disposed on one edge of the earpiece area, and the sound insulation sections are used to stop the sound waves of the earpiece area located on one side of the sound insulation sections from propagating to an opposite side of the sound insulation sections.

15 Claims, 6 Drawing Sheets

(51) Int. Cl.
*H04R 1/28* (2006.01)
*H04R 3/00* (2006.01)
*H04R 17/00* (2006.01)
*H04M 1/02* (2006.01)

(52) U.S. Cl.
CPC ........... *H04R 17/00* (2013.01); *H04M 1/0266* (2013.01); *H04R 2499/11* (2013.01); *H04R 2499/15* (2013.01)

(56) References Cited

U.S. PATENT DOCUMENTS

| | | | |
|---|---|---|---|
| 2015/0022058 A1* | 1/2015 | Okamura | B06B 1/0603 310/332 |
| 2020/0035763 A1 | 1/2020 | Yao et al. | |
| 2020/0107125 A1* | 4/2020 | Choi | H04R 11/02 |
| 2020/0278750 A1* | 9/2020 | Yeon | H01L 27/3225 |

FOREIGN PATENT DOCUMENTS

| | | |
|---|---|---|
| CN | 107561753 | 1/2018 |
| CN | 107786696 | 3/2018 |
| CN | 108124224 | 6/2018 |
| CN | 109037286 | 12/2018 |

\* cited by examiner

DISPLAY MODULE AND MOBILE TERMINAL

RELATED APPLICATIONS

This application is a National Phase of PCT Patent Application No. PCT/CN2019/106813 having International filing date of Sep. 19, 2019, which claims the benefit of priority of Chinese Provisional Patent Application No. 201910577404.X filed on Jun. 28, 2019. The contents of the above applications are all incorporated by reference as if fully set forth herein in their entirety.

FIELD AND BACKGROUND OF THE INVENTION

The present disclosure relates to the field of display technologies, and more particularly to a display module and a mobile terminal.

BACKGROUND OF INVENTION

With development of electronic technology and improved technological levels, full screens are becoming a trend nowadays. However, two major problems that hinder the development of mobile phone screen ratio come from necessary components, such as a traditional home button and the top of an earpiece, a camera, and a sensor. The home button can be substituted by gesture operations, and a fingerprint-on-display technique can be used for a fingerprint recognition of the home button. An under-display camera or a pop-up camera can be used. At last, in order to remove the top earpiece, acoustic surface technology emerges.

However, current acoustic surface disposes an actuator under the display panel, which significantly increases thickness of the entire module, destroys lightness and thinness of the entire module, and brings many problems to the assembly of the whole machine. Additionally, piezoelectric ceramic sound technology is not mature and has many problems. For example, the low frequency effect of current piezoelectric ceramic sound is poor, the directional sound is bad and easy to leak, so privacy cannot be effectively protected.

Therefore, there are defects in current technology and there is an urgent need for improvement.

SUMMARY OF THE INVENTION

The present disclosure provides a display module, and a mobile terminal to solve the problems of a thicker thickness of the entire display module in current acoustic surface, the bad directional sound, and ease to leak thereby causing privacy not being effectively protected.

To solve the above problems, an embodiment of the present disclosure provides technical solutions as following:

an embodiment of the present disclosure provides a display module. The display module comprises:

a display panel, the display panel is provided with an earpiece area;

a vibration function layer disposed on a surface of the display panel and used to make mechanical vibrations under control of electric signals to generate sound waves, wherein the vibration function layer comprises at least one vibration site; and a protective layer disposed on the vibration function layer and used to protect the display module, wherein the protective layer is a cover board or a thin film encapsulation layer;

wherein the vibration function layer comprises an actuator and a vibration layer disposed on the actuator, the actuator comprises a vibrator disposed in the earpiece area and sound insulation sections disposed on at least one side edge of the earpiece area, and the vibration layer vibrates according to vibrations generated by the vibrator;

wherein the sound insulation sections are used to stop the sound waves of the earpiece area located on one side of the sound insulation sections from propagating to an opposite side of the sound insulation sections.

In an embodiment of the present disclosure, the vibration layer comprises at least one layer of stacked piezoelectric material layer and electrode layers disposed on both sides of the piezoelectric material layer.

In an embodiment of the present disclosure, an insulation layer is disposed on one side of the vibration layer facing the display panel, a groove is disposed on the insulation layer, and corresponding portions of the display panel, the insulation layer, the vibration layer, and the groove form a cavity.

In an embodiment of the present disclosure, a height of the sound insulation sections is greater than or equal to a default distance between the vibration layer and the display panel, and when the vibration layer is prepared on the actuator, the sound insulation sections are in a compressed state between the display panel and the vibration layer to achieve sealing.

In an embodiment of the present disclosure, the vibration function layer comprises three vibration sites, three vibrators are respectively disposed to correspond the three vibration sites, the three vibrators are arranged at intervals along an edge of the display panel, a vibration frequency of a first vibrator disposed in a middle section of the earpiece area is less than vibration frequencies of a second vibrator and a third vibrator disposed on both sides of the first vibrator, the vibration frequencies of the second vibrator and the third vibrator are the same, the first vibrator is used to generate bass, and the second vibrator and the third vibrator are both used to generate treble; or the vibration frequency of the second vibrator is less than the vibration frequency of the third vibrator, the second vibrator is used to generate alto, and the third vibrator is used to generate treble.

In an embodiment of the present disclosure, the sound insulation sections are disposed between two of the adjacent vibrators, the sound insulation sections divide the earpiece area into a bass area and a treble area, and the treble area is disposed on both sides of the bass area.

In an embodiment of the present disclosure, a cross-section shape of the sound insulation sections between the two adjacent vibrators along a direction parallel to the display panel is one or more than one combination selected from the group consisting of an arc, a broken line, and a curve.

In an embodiment of the present disclosure, the earpiece area is disposed at one end of the display panel, a direction from the earpiece area to at least one side edge of the earpiece area is a non-default propagating direction, and at least two of the sound insulation sections surround or partially surround the earpiece area, wherein one of the at least two of the sound insulation sections is disposed along the non-default propagating direction, and another of the at least two of the sound insulation sections is disposed along a direction perpendicular to the non-default propagating direction.

To solve the above technical problems, an embodiment of the present disclosure further provides a mobile terminal. The mobile terminal comprises a terminal body and a full screen disposed on the terminal body, wherein the full screen comprises the above display module.

To solve the above problems, an embodiment of the present disclosure further provides a display module. The display module comprises:

a display panel, the display panel is provided with an earpiece area;

a vibration function layer disposed on a surface of the display panel and used to make mechanical vibrations under control of electric signals to generate sound waves, wherein the vibration function layer comprises at least one vibration site; and a protective layer disposed on the vibration function layer and used to protect the display module;

wherein the vibration function layer comprises an actuator and a vibration layer disposed on the actuator, the actuator comprises a vibrator disposed in the earpiece area and sound insulation sections disposed on at least one side edge of the earpiece area, and the vibration layer vibrates according to vibrations generated by the vibrator;

wherein the sound insulation sections are used to stop the sound waves of the earpiece area located on one side of the sound insulation sections from propagating to an opposite side of the sound insulation sections.

In an embodiment of the present disclosure, the vibration layer comprises at least one layer of stacked piezoelectric material layer and electrode layers disposed on both sides of the piezoelectric material layer.

In an embodiment of the present disclosure, an insulation layer is disposed on one side of the vibration layer facing the display panel, a groove is disposed on the insulation layer, and corresponding portions of the display panel, the insulation layer, the vibration layer, and the groove form a cavity.

In an embodiment of the present disclosure, a height of the sound insulation sections is greater than or equal to a default distance between the vibration layer and the display panel, and when the vibration layer is prepared on the actuator, the sound insulation sections are in a compressed state between the display panel and the vibration layer to achieve sealing.

In an embodiment of the present disclosure, the vibration function layer comprises three vibration sites, three vibrators are respectively disposed to correspond the three vibration sites, the three vibrators are arranged at intervals along an edge of the display panel, a vibration frequency of a first vibrator disposed in a middle section of the earpiece area is less than vibration frequencies of a second vibrator and a third vibrator disposed on both sides of the first vibrator, the vibration frequencies of the second vibrator and the third vibrator are the same, the first vibrator is used to generate bass, and the second vibrator and the third vibrator are both used to generate treble; or the vibration frequency of the second vibrator is less than the vibration frequency of the third vibrator, the second vibrator is used to generate alto, and the third vibrator is used to generate treble.

In an embodiment of the present disclosure, the sound insulation sections are disposed between two of the adjacent vibrators, the sound insulation sections divide the earpiece area into a bass area and a treble area, and the treble area is disposed on both sides of the bass area.

In an embodiment of the present disclosure, a cross-section shape of the sound insulation sections between the two adjacent vibrators along a direction parallel to the display panel is one or more than one combination selected from the group consisting of an arc, a broken line, and a curve.

In an embodiment of the present disclosure, the earpiece area is disposed at one end of the display panel, a direction from the earpiece area to at least one side edge of the earpiece area is a non-default propagating direction, and at least two of the sound insulation sections surround or partially surround the earpiece area, wherein one of the at least two of the sound insulation sections is disposed along the non-default propagating direction, and another of the at least two of the sound insulation sections is disposed along a direction perpendicular to the non-default propagating direction.

The beneficial effect of the present disclosure is: compared to the conventional structure that an actuator is disposed under the entire display module, the present disclosure provides a display module and a mobile terminal by embedding the vibration function layer into the display module. Using an embedded structure can significantly drive the entire panel to vibrate and produce sound, and has a lower power consumption and a lighter and thinner structure, thereby improving the screen ratio. The vibration function layer of the present disclosure has a plurality of output sites which can respectively provide treble, alto, and bass, thereby improving the problem of poor low frequency effect caused by having only one output site, realizing stereo, and improving sound quality and user experiences. Besides, a plurality of sound insulation sections is provided to prevent sound from propagating to other places, thereby ensuring directional sound and improving user experiences and privacy.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DESCRIPTION OF SPECIFIC EMBODIMENTS OF THE INVENTION

Figure 1:
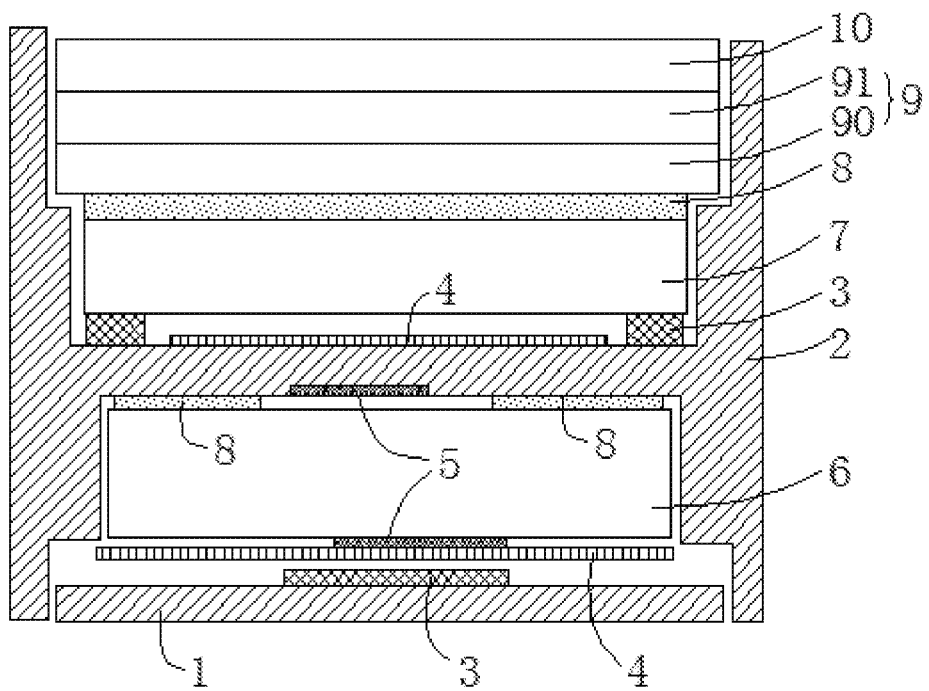
FIG. 1 is a schematic structure diagram of a display module according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. In the description of the present disclosure, it should be understood that terms such as "upper," "lower," "front," "rear," "left," "right," "inside," "outside," "side," as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

An embodiment of the present disclosure provides a solution to solve the technical problem of a thicker thickness of the entire display module in current acoustic surface, bad directional sound, ease to leak, and privacy not being effectively protected.

The vibration function layer having the function to vibrate and produce sound is integrated into the display module in the present disclosure. A display panel in the display module can be an OLED or an LCD, wherein a structure of an OLED display panel is simpler, lighter, thinner, and easier to vibrate and produce sound under driven by the actuator. In addition, there is no liquid crystal layers in OLEDs, screen vibration to produce sound does not affect liquid crystal deflection. LCD panel technology is more mature and more widely used, so take the LCD panel for example to illustrate the present disclosure. Structures and principles are similar in OLEDs.

As shown in FIG. 1, FIG. 1 is a schematic structure diagram of a display module according to an embodiment of the present disclosure. The display module comprises: a back cover 1; a middle frame 2 to form a accommodating chamber with the back cover 1; a battery 6 disposed in the accommodating chamber, wherein the battery 6 is attached to the middle frame 2 by an adhesive 8; graphite 4 disposed on one side of the battery 6 facing the back cover 1, wherein graphite 4 is used to improve heat dissipation; foam 3 disposed between the back cover 1 and graphite 4, wherein the foam 3 is used for buffer and protection; a LCM module 7 disposed in the middle frame 2, wherein the foam 3 and graphite 4 are disposed between the LCM module 7 and the middle frame 2; and a flexible circuit board 5 disposed on the LCM module 7, wherein the flexible circuit board 5 is bent to a back surface of the LCM module 7. A vibration function layer 9 is attached to a surface of the LCM module 7 by the adhesive 8, and is used to make mechanical vibrations under control of electric signals to generate sound waves. A protective layer 10 is disposed on a surface of the vibration function layer 9, and is used to protect the display module.

Wherein the vibration function layer 9 comprises at least one vibration site, generates vibrations, and drives the LCM module 7 to vibrate. The vibration function layer 9 comprises an actuator 90 and a vibration layer 91 disposed on the actuator 90.

Figure 2:
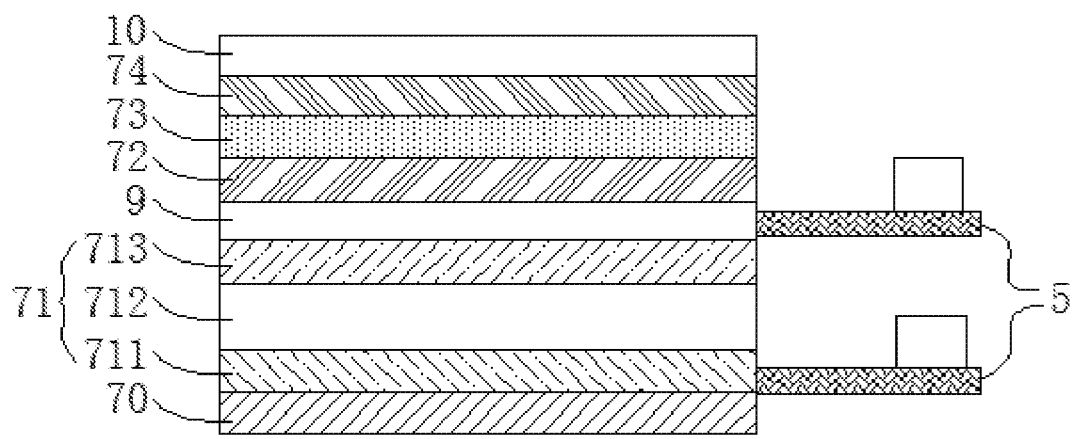
FIG. 2 is a partial schematic structure diagram of the display module in FIG. 1.

As shown in FIG. 2, FIG. 2 is a partial schematic structure diagram of the display module in FIG. 1. The LCM module 7 comprises a backlight module 70 and a display panel 71 disposed opposite to the backlight module 70. A lower polarizer (not shown in FIG. 2) is disposed on one side of the display panel 71 facing the backlight module 70, and the display panel 71 comprises an array substrate 711, a color filter substrate 713, and a liquid crystal layer 712 disposed between the array substrate 711 and the color filter substrate 713. The flexible circuit board 5 is bonded to the display panel 71, and the vibration function layer 9 is disposed on a surface of the display panel 71. The display module further comprises an upper polarizer 72 and a touch layer 74 disposed on the vibration function layer 9 in sequence, the upper polarizer 72 is attached to the touch layer 74 by an adhesive agent 73, and the protective layer 10 is disposed on a surface of the touch layer 74. In the embodiment, the protective layer 10 is a cover board, but it is not limited thereto.

The vibration function layer 9 is disposed on the color filter substrate 713, the vibration layer 91 is composed of a piezoelectric material and an electrode, and when an alternating voltage is applied, the piezoelectric material will generate high frequency vibrations. Therefore, the vibration layer 91 will drive the display panel 71 to vibrate. The vibrations of the display panel 71 will drive ambient air to vibrate, thereby producing sound waves propagating into a human ear, and play the role of a conventional earpiece. The vibration function layer 9 is embedded into the display module and disposed on a surface of the color filter substrate 713. Compared to the conventional structure which is disposed under the entire display module, the present disclosure uses an embedded structure which can significantly drive the entire display panel 71 to vibrate and produce sound, and has a lower power consumption and a lighter and thinner structure, thereby significantly reducing the thickness of the entire mobile phone module without reserving space for the vibration layer and the actuator like conventional acoustic surface structures.

The vibration function layer 9 is usually a piezoelectric type or an electromagnetic type. The electromagnetic type uses a forced conductive coil in a magnetic field to move up and down, thereby driving the display panel to vibrate and produce sound. The piezoelectric type is to input a high voltage AC signal to the piezoelectric material to make it vibrate by an inverse piezoelectric effect, thereby driving the display panel to vibrate.

Take the piezoelectric type for example to illustrate the present disclosure.

Figure 3:
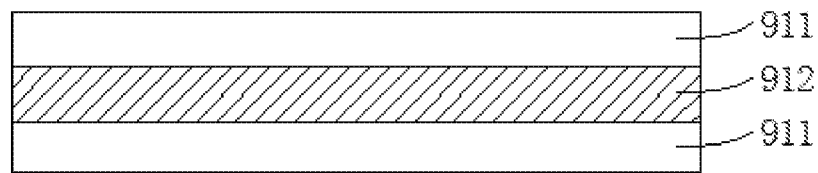
FIG. 3 is a schematic structure diagram of a vibration layer comprising a single layer of piezoelectric material layer according to an embodiment of the present disclosure.

As shown in FIG. 3, the vibration layer 91 comprises at least one layer of stacked piezoelectric material layer 912 and electrode layers 911 disposed on both sides of the piezoelectric material layer 912. When a drive integrated circuit inputs a high voltage alternating electric signal, the piezoelectric material layer 912 vibrates upward or downward to drive the entire display panel 71 (or the display module) to vibrate and produce sound, realizing sound on display. The vibration function layer 9 is disposed in the middle of the entire display module, so it can significantly drive the entire display module to vibrate and produce sound. Additionally, this kind of vibrations is more uniform and has a lower power consumption.

Wherein a material of the piezoelectric material layer 912 can be one or more of the following: lead zirconate titanate (PZT), aluminum nitride (AlN), polyvinylidene fluoride (PVDF), and polyvinylidene fluoride-trifluoroethylene copolymer P(VDF-TrFE).

When a material of the piezoelectric material layer 912 is PZT, because the sintering temperature of PZT is greater than 1000° C., the piezoelectric material layer 912 can be attached onto the color filter substrate 713 by a glue or a double-sided adhesive after finishing PZT polarization process and coating a corresponding electrode.

When material of the piezoelectric material layer 912 is a polymer such as PVDF or P(VDF-TrFE), because the processing temperature is just more than 100° C., the piezoelectric material layer 912 can be directly fabricated on a glass substrate in situ.

A material of the electrode layer 911 can be one or more combinations of the following: Ag, Al, Mo, Au, Cr, Ni, Cu, and Pt, or can be a transparent electrode ITO, but it is not limited thereto.

Figure 4:
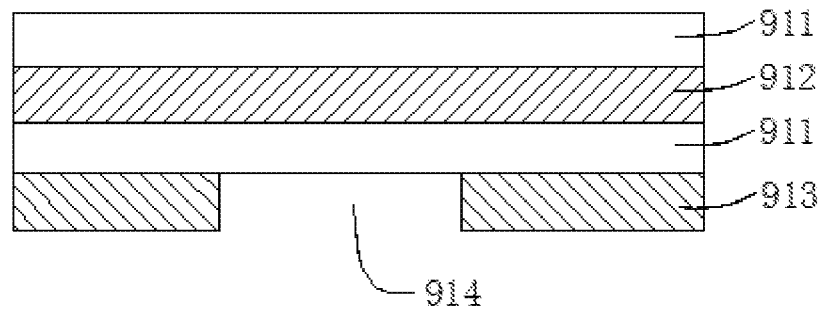
FIG. 4 is a schematic structure diagram of another vibration layer comprising a single layer of piezoelectric material layer according to an embodiment of the present disclosure.

As shown in FIG. 4, an insulation layer 913 is disposed on one side of the vibration layer 91 facing the display panel 71, a groove 914 is disposed on the insulation layer 913, and corresponding portions of the display panel 71, the insulation layer 913, the vibration layer 91, and the groove 914 form a cavity. The existence of the cavity is more favorable to the vibrations of the vibration layer 91 and to produce stronger sound waves. The cavity can penetrate or partially penetrate the insulation layer 913. The specific position of the cavity is not limited, and it can be disposed correspondingly to the actuator or other areas.

Figure 5:
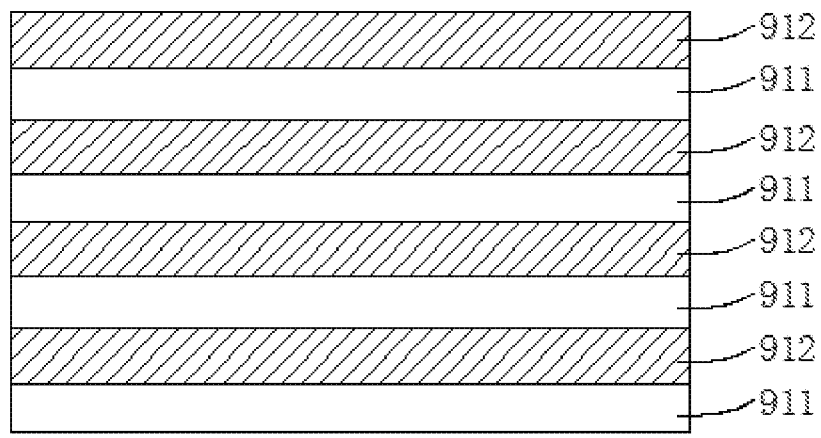
FIG. 5 is a schematic structure diagram of a vibration layer comprising multi-layered piezoelectric material layer according to an embodiment of the present disclosure.

As shown in FIG. 5, a multi-layer structure can be used as the piezoelectric material layer 912, the corresponding electrode layers 911 and the piezoelectric material layer 912 are alternately stacked. The vibration layer 91 uses the multi-layer structure of the piezoelectric material layer 912, making the vibration displacement of the vibration layer 91 is greater and more uniform. Therefore, the vibration output can be better, thereby driving the entire display module to vibrate and produce sound, and the sound quality is better.

Figure 6:
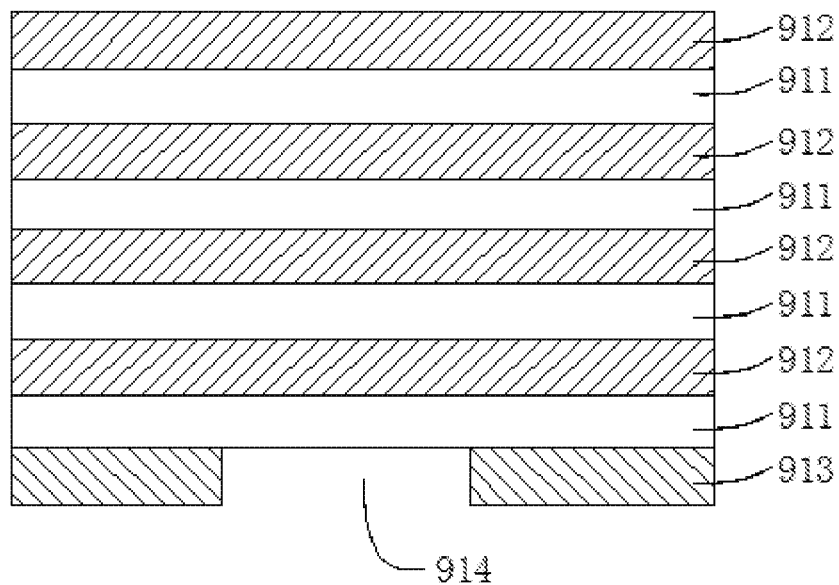
FIG. 6 is a schematic structure diagram of another vibration layer comprising multi-layered piezoelectric material layer according to an embodiment of the present disclosure.

As shown in FIG. 6, an insulation layer 913 is disposed on one side of the vibration layer 91 which uses the multi-layer structure of the piezoelectric material layer 912, facing the display panel 71, a groove 914 is disposed on the insulation layer 913, and corresponding portions of the display panel 71, the insulation layer 913, the vibration layer 91, and the groove 914 form a cavity which is more favorable to the vibrations of the vibration layer 91 and to produce stronger sound waves.

Figure 7:
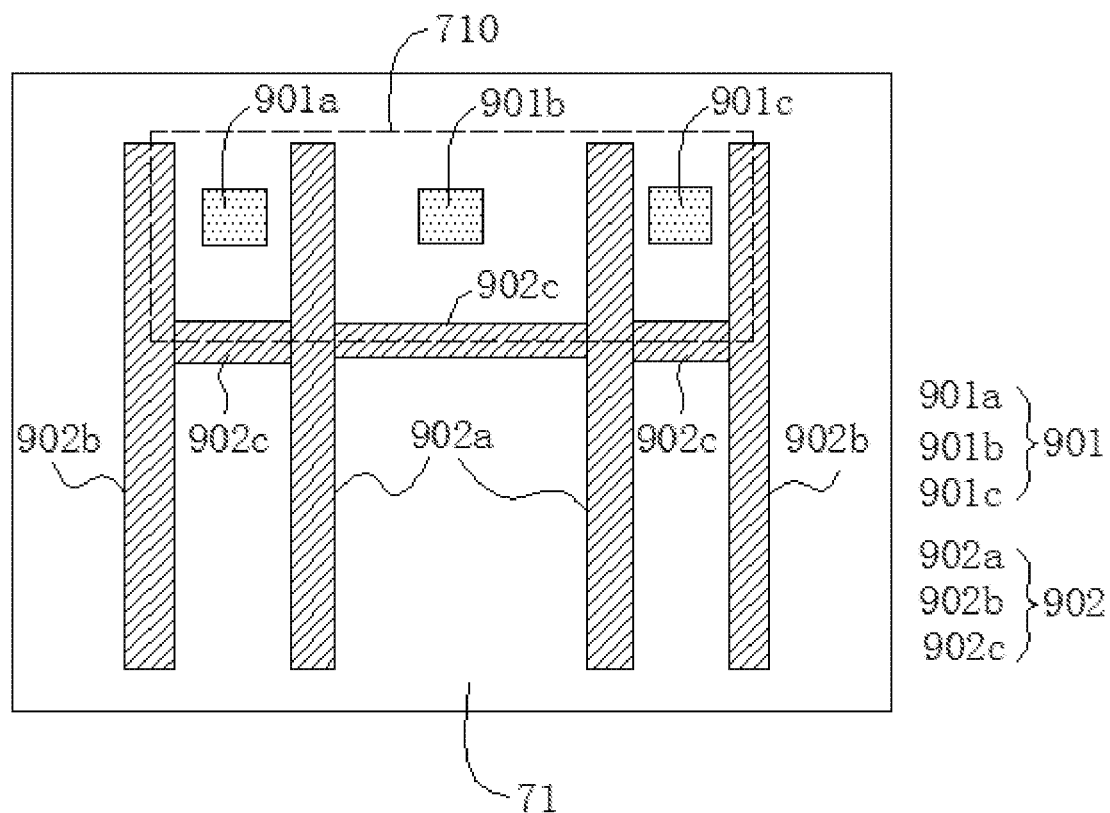
FIG. 7 is a first schematic planar structure diagram of the actuator according to an embodiment of the present disclosure.

As shown in FIG. 7, the display panel 71 is provided with an earpiece area 710, the actuator 90 comprises a vibrator 901 disposed in the earpiece area 710 and sound insulation sections 902 disposed on at least one side edge of the earpiece area 710, and the vibration layer 91 vibrates according to vibrations generated by the vibrator 901; wherein the sound insulation sections 902 are used to stop the sound waves of the earpiece area 710 located on one side of the sound insulation sections 902 from propagating to an opposite side of the sound insulation sections 902.

The vibration function layer 9 can use a single vibration site. Using a single vibration site to drive the entire vibration function layer 9 to vibrate makes the manufacturing process simple and the cost lower. The vibration function layer 9 can also use a plurality of vibration sites, which makes the sound effect better. Take an example having three vibration sites to illustrate the present disclosure.

The vibration function layer 9 comprises three vibration sites, three vibrators 901 are respectively disposed to correspond the three vibration sites, the three vibrators 901 are arranged at intervals along an edge of the display panel 71. Wherein the vibration frequency of the three vibrators 901 can be the same, or can be different to respectively make treble, alto, and bass.

For example, a vibration frequency of a first vibrator 901b disposed in a middle section of the earpiece area 710 is less than vibration frequencies of a second vibrator 901a and a third vibrator 901c disposed on both sides of the first vibrator 901b, the vibration frequencies of the second vibrator 901a and the third vibrator 901c are the same, the first vibrator 901b is used to generate bass, and the second vibrator 901a and the third vibrator 901c are both used to generate treble. Since bass and treble are generated by separate vibrators, mutual influence is avoided, thereby improving the problem of poor low frequency effect of a single vibrator. Or the vibration frequency of the second vibrator 901a is less than the vibration frequency of the third vibrator 901c, the second vibrator 901a is used to generate alto, and the third vibrator 901c is used to generate treble. Since bass, alto, and treble are generated by separate vibrators, mutual influence is avoided, and even if the low frequency is pushed close to the limit, the high frequency is still unaffected, keeping clear and bright, thereby further optimizing the vibration sounding effect of the vibration function layer 9.

A first sound insulation section 902a is disposed between two of the adjacent vibrators 901, the first sound insulation section 902a divides the earpiece area 710 into a bass area and a treble area. As shown in FIG. 7, the earpiece area 710 between two of the first sound insulation section 902a is the bass area, and defined by the first sound insulation section 902a, the earpiece area 710 disposed on both sides of the bass area is the treble area. Therefore, it eliminates the mutual sound interference, realizes stereo, and improves sound quality and user experiences.

The earpiece area 710 is disposed at one end of the display panel 71, but it is not limited thereto. A direction from the earpiece area 710 to at least one side edge of the earpiece area 710 is a non-default propagating direction. The non-default propagating direction is a direction to prevent sound from coming out, that is making the sound in the earpiece area 710 propagate along a default propagating direction and preventing the sound from coming out in other directions, thereby improving privacy and preventing information disclosure.

At least two of the sound insulation sections 902 surround or partially surround the earpiece area 710, wherein one of the at least two of the sound insulation sections 902 is disposed along the non-default propagating direction, and another of the at least two of the sound insulation sections 902 is disposed along a direction perpendicular to the non-default propagating direction.

Specifically, as shown in FIG. 7, a combination of five sound insulation sections 902 partially surrounds the earpiece area 710. Second sound insulation sections 902b are disposed respectively on the leftmost and the rightmost edges of the earpiece area 710, thereby preventing the sound waves of the earpiece area 710 from propagating from the left and right sides, which causes sound leakage, reducing volume loss, and increasing output volume. Besides, a third sound insulation section 902c is disposed under a lower edge of the earpiece area 710, making the sound not leak out from the lower edge of the earpiece area 710, thereby reducing volume loss, and increasing output volume.

There's no limit to the size and range of the earpiece area 710 in the embodiment of the present disclosure, and the size can be defined in accordance of actual needs. Besides, there's also no limit to the sound insulation sections 902 outside the earpiece area 710. As shown in FIG. 7, the sound insulation sections 902 can extend beyond the earpiece area 710 or nest the sound insulation sections 902 of the earpiece area 710, thereby forming a multi-layered barrier and improving the sound insulation effect.

Moreover, the sound insulation effect and the output volume can be adjusted by adjusting the height and width of the sound insulation sections 902. A height of the sound insulation sections 902 in an uncompressed state is greater than a default distance between the vibration layer 91 and the display panel 71, and when the vibration layer 91 is prepared on the actuator 90, the sound insulation sections 902 are in a compressed state between the display panel 71 and the vibration layer 91 to achieve a good sealing effect. When an intrinsic height of the sound insulation sections 902 is higher, the degree of compression is greater, thereby realizing a better sealing effect. However, when the height of the sound insulation sections 902 is too high, it will affect output of the sound, and the output volume will be small. Therefore, the height of the sound insulation sections 902 can be set in accordance of actual needs of the manufacturing process.

Besides, the intrinsic height of the sound insulation sections 902 can also equal to a default distance between the vibration layer 91 and the display panel 71.

The width of the sound insulation sections 902 has a similar principle. When the width of the sound insulation sections 902 is wider, the available range to provide vibrations is smaller. Therefore, the sound insulation effect is better, but the output volume is smaller. A height of the sound insulation sections 902 usually ranges from 1 mm to 100 mm, and a width of the sound insulation sections 902 usually ranges from 1 mm to 50 mm. The best height and width parameters can be chosen according to the sound quality and volume needed, and it is not limited thereto.

Figure 8:
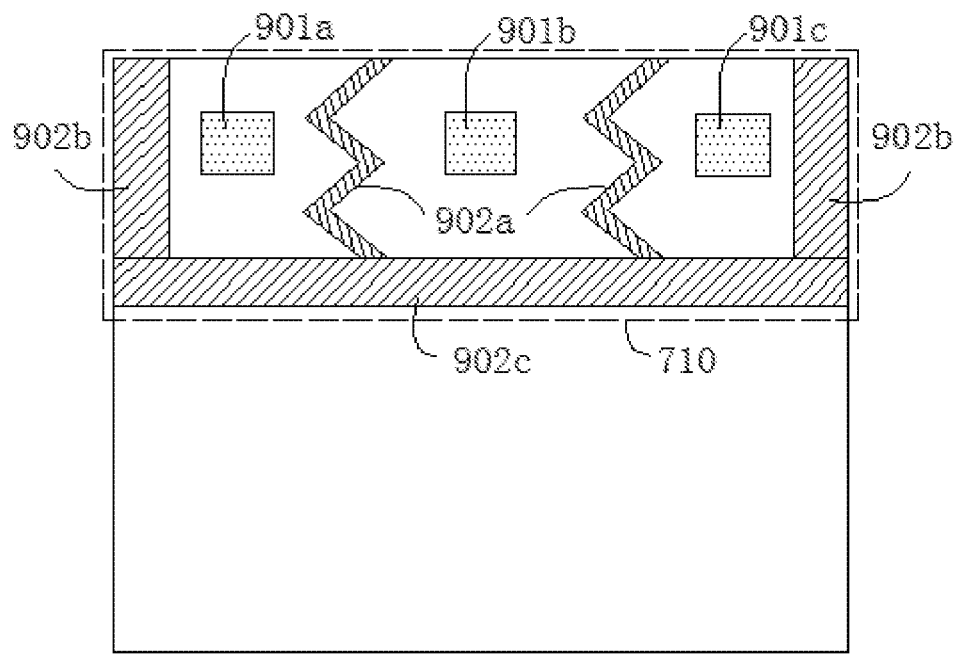
FIG. 8 is a second schematic planar structure diagram of the actuator according to an embodiment of the present disclosure.
Figure 9:
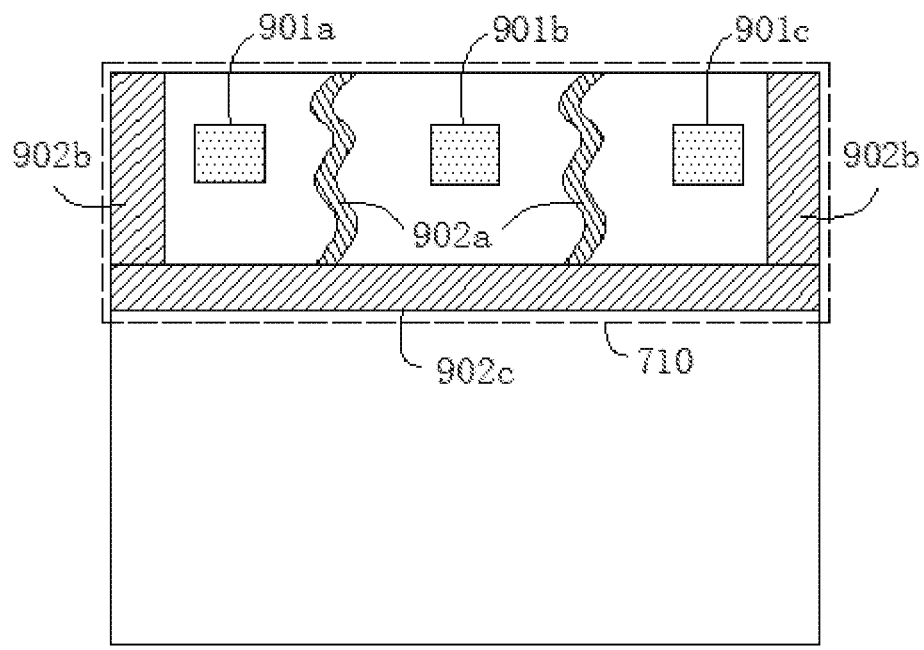
FIG. 9 is a third schematic planar structure diagram of the actuator according to an embodiment of the present disclosure.
Figure 10:
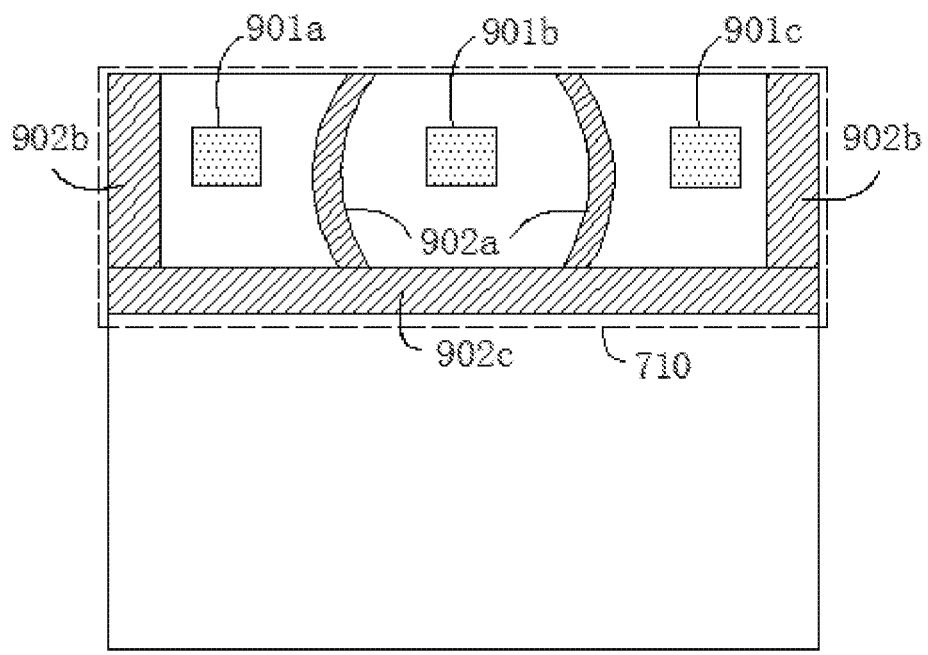
FIG. 10 is a fourth schematic planar structure diagram of the actuator according to an embodiment of the present disclosure.

As shown from FIG. 8 to FIG. 10, a cross-section shape of the sound insulation sections 902 between the two adjacent vibrators 901 along a direction parallel to the display panel 71 is one or more than one combination selected from the group consisting of an arc, a broken line, and a curve, but it is not limited thereto. The first sound insulation sections 902a are disposed among the different vibrators 901, thereby eliminating the mutual sound interference, realizing stereo, and improving sound quality and user experiences.

It should be noted that, the shape of the first sound insulation sections 902a is irregular, which is mainly to prevent generation of standing waves. As shown in FIG. 7, the cross-section shape of the first sound insulation sections 902a is a rectangle, the sound waves will be reflected when encounter the first sound insulation sections 902a, and form standing waves with other sound waves, thereby affecting the frequency and sound pressure of the output sound. Therefore, make a surface of the first sound insulation sections 902a facing the vibrator 901 as a microstructure or change the overall shape thereof, thereby reducing reflection of the sound waves in the first sound insulation sections 902a, preventing generation of standing waves, and improving sound quality.

The second sound insulation sections 902b and the third sound insulation sections 902c can also adopt the same design as the first sound insulation sections 902a, which will not be iterated herein for the sake of conciseness.

Figure 11:
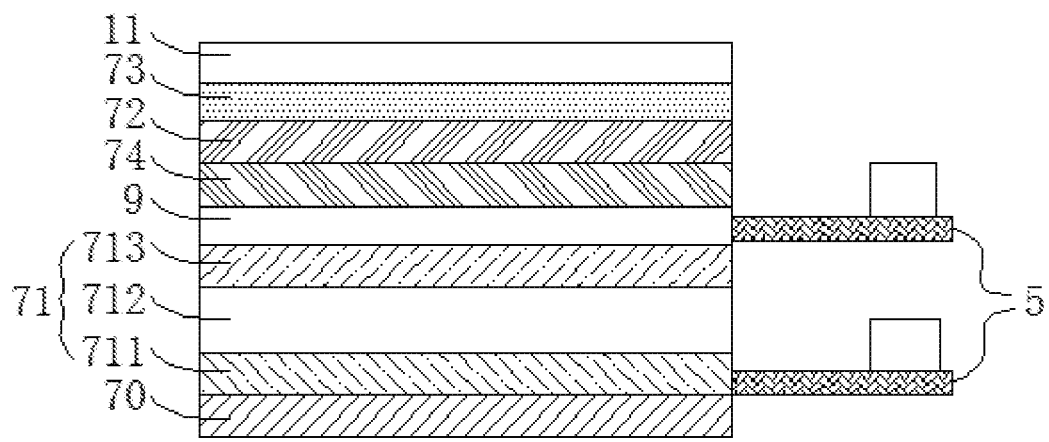
FIG. 11 is a schematic structure diagram of another display module according to an embodiment of the present disclosure.

As shown in FIG. 11, FIG. 11 is a schematic structure diagram of another display module according to an embodiment of the present disclosure. Compared to FIG. 2, the position of the touch layer 74 is different in the embodiment. The touch layer 74 is disposed on the color filter substrate 713, and the display module is an on-cell structure. Wherein the touch layer 74 can be directly disposed on a surface of the color filter substrate 713. Other structures of the display module in the embodiment are the same as those in FIG. 2, which will not be iterated herein for the sake of conciseness.

Figure 12:
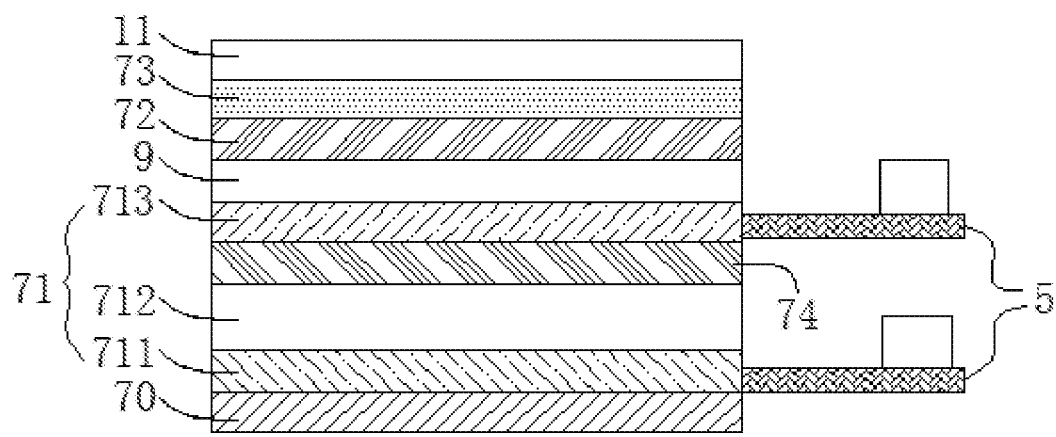
FIG. 12 is a schematic structure diagram of the other display module according to an embodiment of the present disclosure.

As shown in FIG. 12, FIG. 12 is a schematic structure diagram of the other display module according to an embodiment of the present disclosure. Compared to FIG. 2 and FIG. 11, the position of the touch layer 74 is different in this embodiment. The touch layer 74 is disposed on a surface of the color filter substrate 713 adjacent to the liquid crystal layer 712, and the display module is a in-cell structure, which makes the display module lighter and thinner. Other structures of the display module in the embodiment are the same as those in FIG. 2, which will not be iterated herein for the sake of conciseness.

An embodiment of the present disclosure further provides a mobile terminal which comprises, but not limited to, electronic products such as mobile phones. The mobile terminal comprises a terminal body and a full screen disposed on the terminal body, wherein the full screen comprises the above display module. Wherein a display panel in the display module can be an OLED or an LCD, the protective layer is a cover board or a thin film encapsulation layer, and it can refer to the above embodiments for details of the display module, which will not be iterated herein for the sake of conciseness.

In summary, compared to the conventional structure that an actuator is disposed under the entire display module, the present disclosure provides a display module and a mobile terminal by embedding the vibration function layer into the display module. Using an embedded structure can significantly drive the entire panel to vibrate and produce sound, and has a lower power consumption and a lighter and thinner structure, thereby improving the screen ratio. It can improve the problem of poor low frequency effect, realize stereo, and improve sound quality and user experiences. Besides, the sound insulation sections are provided to prevent sound from propagating to other places, thereby ensuring directional sound and improving user experiences and privacy.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A display module, comprising:
  a display panel, the display panel is provided with an earpiece area;
  a vibration function layer disposed on a surface of the display panel and used to make mechanical vibrations under control of electric signals to generate sound waves, wherein the vibration function layer comprises at least one vibration site; and
  a protective layer disposed on the vibration function layer and used to protect the display module, wherein the protective layer is a cover board or a thin film encapsulation layer;

wherein the vibration function layer comprises an actuator and a vibration layer disposed on the actuator, the actuator comprises a vibrator disposed in the earpiece area and sound insulation sections disposed on at least one side edge of the earpiece area, and the vibration layer vibrates according to vibrations generated by the vibrator;

wherein the sound insulation sections are used to stop the sound waves of the earpiece area located on one side of the sound insulation sections from propagating to an opposite side of the sound insulation sections; and an insulation layer is disposed on one side of the vibration layer facing the display panel, a groove is defined on the insulation layer, and corresponding portions of the display panel, the insulation layer, the vibration layer, and the groove form a cavity.

2. The display module according to claim 1, wherein the vibration layer comprises at least one layer of stacked piezoelectric material layer and electrode layers disposed on both sides of the piezoelectric material layer.

3. The display module according to claim 1, wherein a height of the sound insulation sections is greater than or equal to a default distance between the vibration layer and the display panel, and when the vibration layer is prepared on the actuator, the sound insulation sections are in a compressed state between the display panel and the vibration layer to achieve sealing.

4. The display module according to claim 1, wherein the vibration function layer comprises three vibration sites, three vibrators are disposed corresponding to the three vibration sites, respectively, the three vibrators are arranged at intervals along an edge of the display panel, a vibration frequency of a first vibrator disposed in a middle section of the earpiece area is less than vibration frequencies of a second vibrator and a third vibrator disposed on both sides of the first vibrator, the vibration frequencies of the second vibrator and the third vibrator are same, the first vibrator is used to generate bass, and the second vibrator and the third vibrator are both used to generate treble; or the vibration frequency of the second vibrator is less than the vibration frequency of the third vibrator, the second vibrator is used to generate alto, and the third vibrator is used to generate treble.

5. The display module according to claim 4, wherein the sound insulation sections are disposed between two of adjacent vibrators, the sound insulation sections divide the earpiece area into a bass area and a treble area, and the treble area is disposed on both sides of the bass area.

6. The display module according to claim 5, wherein a cross-section shape of the sound insulation sections between the two of the adjacent vibrators along a direction parallel to the display panel is one or more than one combination selected from a group consisting of an arc, a broken line, and a curve.

7. The display module according to claim 5, wherein the earpiece area is disposed at one end of the display panel, a direction from the earpiece area to at least one side edge of the earpiece area is a non-default propagating direction, and at least two of the sound insulation sections surround or partially surround the earpiece area, wherein one of the at least two of the sound insulation sections is disposed along the non-default propagating direction, and another of the at least two of the sound insulation sections is disposed along a direction perpendicular to the non-default propagating direction.

8. A mobile terminal, comprising a terminal body and a full screen disposed on the terminal body, wherein the full screen comprises the display module according to claim 1.

9. A display module, comprising:
a display panel, the display panel is provided with an earpiece area;
a vibration function layer disposed on a surface of the display panel and used to make mechanical vibrations under control of electric signals to generate sound waves, wherein the vibration function layer comprises at least one vibration site; and
a protective layer disposed on the vibration function layer and used to protect the display module;

wherein the vibration function layer comprises an actuator and a vibration layer disposed on the actuator, the actuator comprises a vibrator disposed in the earpiece area and sound insulation sections disposed on at least one side edge of the earpiece area, and the vibration layer vibrates according to vibrations generated by the vibrator;

wherein the sound insulation sections are used to stop the sound waves of the earpiece area located on one side of the sound insulation sections from propagating to an opposite side of the sound insulation sections; and an insulation layer is disposed on one side of the vibration layer facing the display panel, a groove is defined on the insulation layer, and corresponding portions of the display panel, the insulation layer, the vibration layer, and the groove form a cavity.

10. The display module according to claim 9, wherein the vibration layer comprises at least one layer of stacked piezoelectric material layer and electrode layers disposed on both sides of the piezoelectric material layer.

11. The display module according to claim 9, wherein a height of the sound insulation sections is greater than or equal to a default distance between the vibration layer and the display panel, and when the vibration layer is prepared on the actuator, the sound insulation sections are in a compressed state between the display panel and the vibration layer to achieve sealing.

12. The display module according to claim 9, wherein the vibration function layer comprises three vibration sites, three vibrators are disposed corresponding to the three vibration sites, respectively, the three vibrators are arranged at intervals along an edge of the display panel, a vibration frequency of a first vibrator disposed in a middle section of the earpiece area is less than vibration frequencies of a second vibrator and a third vibrator disposed on both sides of the first vibrator, the vibration frequencies of the second vibrator and the third vibrator are same, the first vibrator is used to generate bass, and the second vibrator and the third vibrator are both used to generate treble; or the vibration frequency of the second vibrator is less than the vibration frequency of the third vibrator, the second vibrator is used to generate alto, and the third vibrator is used to generate treble.

13. The display module according to claim 12, wherein the sound insulation sections are disposed between two of adjacent vibrators, the sound insulation sections divide the earpiece area into a bass area and a treble area, and the treble area is disposed on both sides of the bass area.

14. The display module according to claim 13, wherein a cross-section shape of the sound insulation sections between the two of the adjacent vibrators along a direction parallel to the display panel is one or more than one combination selected from a group consisting of an arc, a broken line, and a curve.

15. The display module according to claim 13, wherein the earpiece area is disposed at one end of the display panel, a direction from the earpiece area to at least one side edge of the earpiece area is a non-default propagating direction, and at least two of the sound insulation sections surround or partially surround the earpiece area, wherein one of the at least two of the sound insulation sections is disposed along the non-default propagating direction, and another of the at least two of the sound insulation sections is disposed along a direction perpendicular to the non-default propagating direction.

\* \* \* \* \*